(12) United States Patent
Kawano

(10) Patent No.: US 6,445,410 B2
(45) Date of Patent: *Sep. 3, 2002

(54) IMAGE INPUT APPARATUS HAVING INTERCHANGEABLE IMAGE PICKUP DEVICE AND PAN HEAD

(75) Inventor: Kenji Kawano, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/547,201

(22) Filed: Oct. 24, 1995

(30) Foreign Application Priority Data

Nov. 10, 1994 (JP) .............................. 6-301369

(51) Int. Cl.[7] ........................ H04N 5/232; H04N 5/225; H04N 7/18
(52) U.S. Cl. ....................... 348/211; 348/373; 348/214; 348/143
(58) Field of Search ................................. 348/211, 214, 348/552, 143, 373, 376, 15, 14.08, 14.09, 141; 352/243, 242, 244; 396/424, 427, 532, 71, 419, 428, 422

(56) References Cited

U.S. PATENT DOCUMENTS

| 5,040,068 | A | * | 8/1991 | Parulski et al. ............. 348/376 |
| 5,111,288 | A | * | 5/1992 | Blackshear .................. 348/143 |
| 5,413,295 | A | * | 5/1995 | Ishikawa ..................... 248/183 |
| 5,455,650 | A | * | 10/1995 | Fujiwara ...................... 396/71 |
| 5,479,203 | A | * | 12/1995 | Kawai et al. ................. 348/15 |
| 5,745,223 | A | * | 4/1998 | Ikeda .......................... 348/211 |
| 5,838,368 | A | * | 11/1998 | Masunaga et al. .......... 348/211 |
| 5,898,459 | A | * | 4/1999 | Smith et al. ................. 348/211 |
| 5,929,904 | A | * | 7/1999 | Uchida ........................ 348/211 |
| 6,011,925 | A | * | 1/2000 | Hosoe ......................... 396/427 |

* cited by examiner

Primary Examiner—Wendy R. Garber
Assistant Examiner—Jacqueline Wilson
(74) Attorney, Agent, or Firm—Fitzpatrick, Cella, Harper & Scinto

(57) ABSTRACT

An image input apparatus has a pan head for mounting an image pickup device thereon and for changing the image pickup direction of the image pickup device. The image pickup device has an engaging device, and control terminals capable of transmitting specification information about an operation of the pan head from the image pickup device to the pan head. The pan head has a holding device to be engaged with the engaging device so as to interchangeably hold the image pickup device, identifying terminals capable of receiving the specification information when the image pickup device is held by the holding device, and a selection circuit for selecting an operation of the pan head corresponding to the held image pickup device based on the received specification information.

62 Claims, 13 Drawing Sheets

FIG. 3
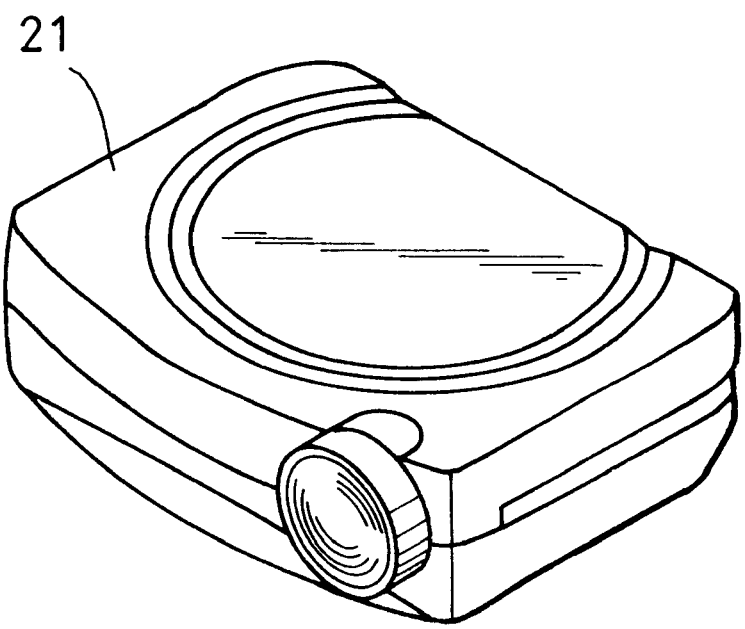
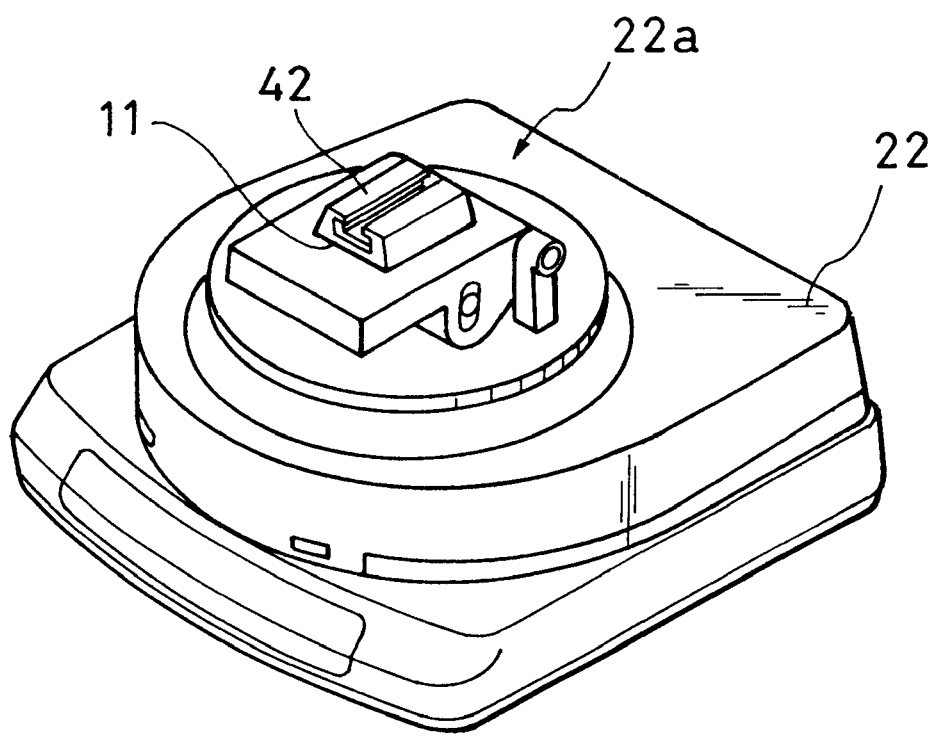

FIG. 10

| | PAN HEAD SWITCH | | | CAMERA HEAD UNIT | |
|---|---|---|---|---|---|
| | 11(a) | 11(b) | 11(c) | LENS WEIGHT | FOCAL LENGTH |
| M1 | ON | OFF | OFF | BELOW 300g | STANDARD |
| M2 | ON | OFF | ON | ABOVE 300g BELOW 600g | STANDARD |
| M3 | ON | ON | OFF | ABOVE 600g | STANDARD |
| M4 | ON | ON | ON | BELOW 300g | WIDE ANGLE |
| M5 | OFF | OFF | ON | ABOVE 300g BELOW 600g | WIDE ANGLE |
| M6 | OFF | ON | OFF | ABOVE 300g BELOW 600g | TELEPHOTO |
| M7 | OFF | ON | ON | ABOVE 600g | TELEPHOTO |
| M8 | OFF | OFF | OFF | NOT MOUNTED | |

IMAGE INPUT APPARATUS HAVING INTERCHANGEABLE IMAGE PICKUP DEVICE AND PAN HEAD

BACKGROUND OF THE INVENTION

1. Field of the Invention

The present invention relates to a pan head for turning a pedestal (which has a mechanism for holding an image pickup device) in at least one of the horizontal and vertical directions. The present invention also relates to an image pickup device held by such a pan head, and to an image input apparatus provided with both the pan head and the image pickup device.

2. Description of the Related Art

In recent years, a video camera which generates video signals corresponding to a subject has been widely used as an image input apparatus for a computer, and a combination system made up of this video camera and a computer (for example, a personal computer and a work station) is proceeding toward practical utilization in electronic mail for images, a videoconference system, and the like.

In these electronic image mail and video conference systems, a monitoring camera developed for monitoring, an image input apparatus equipped with a combination of a monitoring camera with a remote controlled lens and a remote controlled pan head for holding the monitoring camera, and the like are used.

For example, in a videoconference system using only a monitoring camera, the monitoring camera is fixed on the ceiling, the wall or the like so as to capture a predetermined image taking area. However, since the image taking area of the monitoring camera is thus predetermined, it is impossible to adapt to various circumstances, for example, to concentrate image taking on an arbitrary speaker, by changing the image taking area during a videoconference, which thus results in a failure to sufficiently deliver functionality with respect to the videoconference.

On the other hand, in a videoconference system using an image input apparatus equipped with a combination of a monitoring camera with a remote controlled lens and a remote controlled pan head for holding the monitoring camera, the pan head with the monitoring camera mounted thereon is fixed on the ceiling, the wall or the like, and the lens and the pan head are driven by remote control as occasion demands. Since this method can change the image taking area and direction by remote control, it is possible to readily concentrate image taking on an arbitrary speaker, or to take an image of the whole or part of a conference room, and therefore, to sufficiently deliver functionality required for the videoconference. Furthermore, a camera with a lens having an appropriate focal length can be mounted on the pan head, which allows the choice of a video camera with reference to the environment such as a conference room.

The above-mentioned image input apparatus is equipped with a pan head for interchangeably mounting a video camera thereon to choose a video camera suited to the environment. However, since the driving force of a pedestal in the pan head is set such as to cope with the heaviest video camera to be mounted thereon, a large pan head, which is high in cost, is needed. Therefore, it is difficult to obtain a low-cost image input apparatus.

Furthermore, it is necessary to change the control on the pan head in accordance with a video camera at every replacement of the video camera, and this change is troublesome.

In order to lower the cost of the pan head and to simplify the change of control on the pan head, a videoconference camera combining an image pickup device and a pan head has been developed and is nearing practical use. However, since the image pickup device and the pan head are combined in the videoconference camera, it is impossible to choose the camera with reference to the environment, such as a conference room.

SUMMARY OF THE INVENTION

An object of the present invention is to provide an image input apparatus which solves the above problems, achieves high general versatility, reduces cost, and simplifies the change of operation control on a pan head.

In order to achieve the above object, according to an aspect of the present invention, there is provided an image input apparatus having a pan head for mounting an image pickup device thereon and for changing the image pickup direction (or orientation) of said image pickup device, wherein the image pickup device comprises an engaging portion and a transmission means capable of transmitting specification information about an operation of the pan head from the image pickup device to the pan head, and the pan head comprises a holding portion to be engaged with the engaging portion so as to interchangeably hold the image pickup device, a receiving means capable of receiving the specification information when the image pickup device is held by the holding portion, and a selection means for selecting an operation of the pan head corresponding to the held image pickup device based on the specification information received.

According to another aspect of the present invention, there is provided a pan head for mounting an image pickup device thereon and for changing the image pickup direction of the image pickup device, the pan head comprising a holding means for interchangeably holding the image pickup device, and a selection means for selecting an operation of the pan head corresponding to the image pickup device when the image pickup device is mounted on the holding means.

According to a further aspect of the present invention, there is provided an image pickup device mountable on a pan head capable of changing the image pickup direction of the image pickup device, the image pickup device comprising an engaging portion to be engaged with a holding portion provided in the pan head, and a transmission means capable of transmitting information about an operation of the pan head from the image pickup device to the pan head.

These and other objects, features and advantages of the present invention will become more apparent from the following description of the preferred embodiment taken in conjunction with the accompanying drawings.

BRIEF DESCRIPTION OF THE DRAWINGS

FIG. 3 is a perspective view showing a state in which a camera head unit and a pan head unit of the image input apparatus shown in FIG. 1 are separate;

FIG. 10 is a view showing patterns of pan head switching control modes in the image input apparatus shown in FIG. 1;

DESCRIPTION OF THE PREFERRED EMBODIMENT

A preferred embodiment of the present invention will now be described in conjunction with the accompanying drawings.

Figure 1:
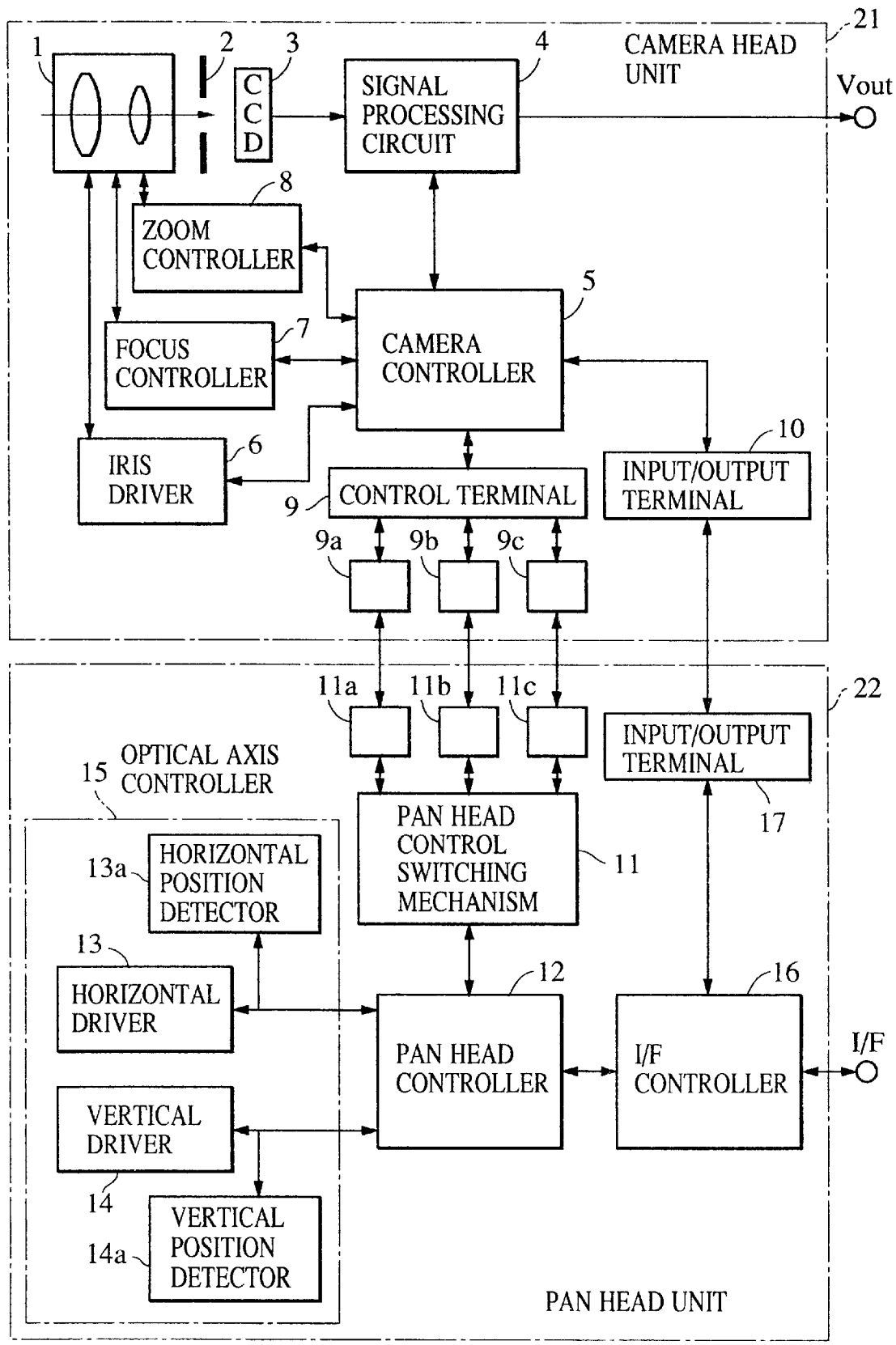
FIG. 1 is a block diagram showing the configuration of an embodiment of an image input apparatus according to the present invention.
Figure 2:
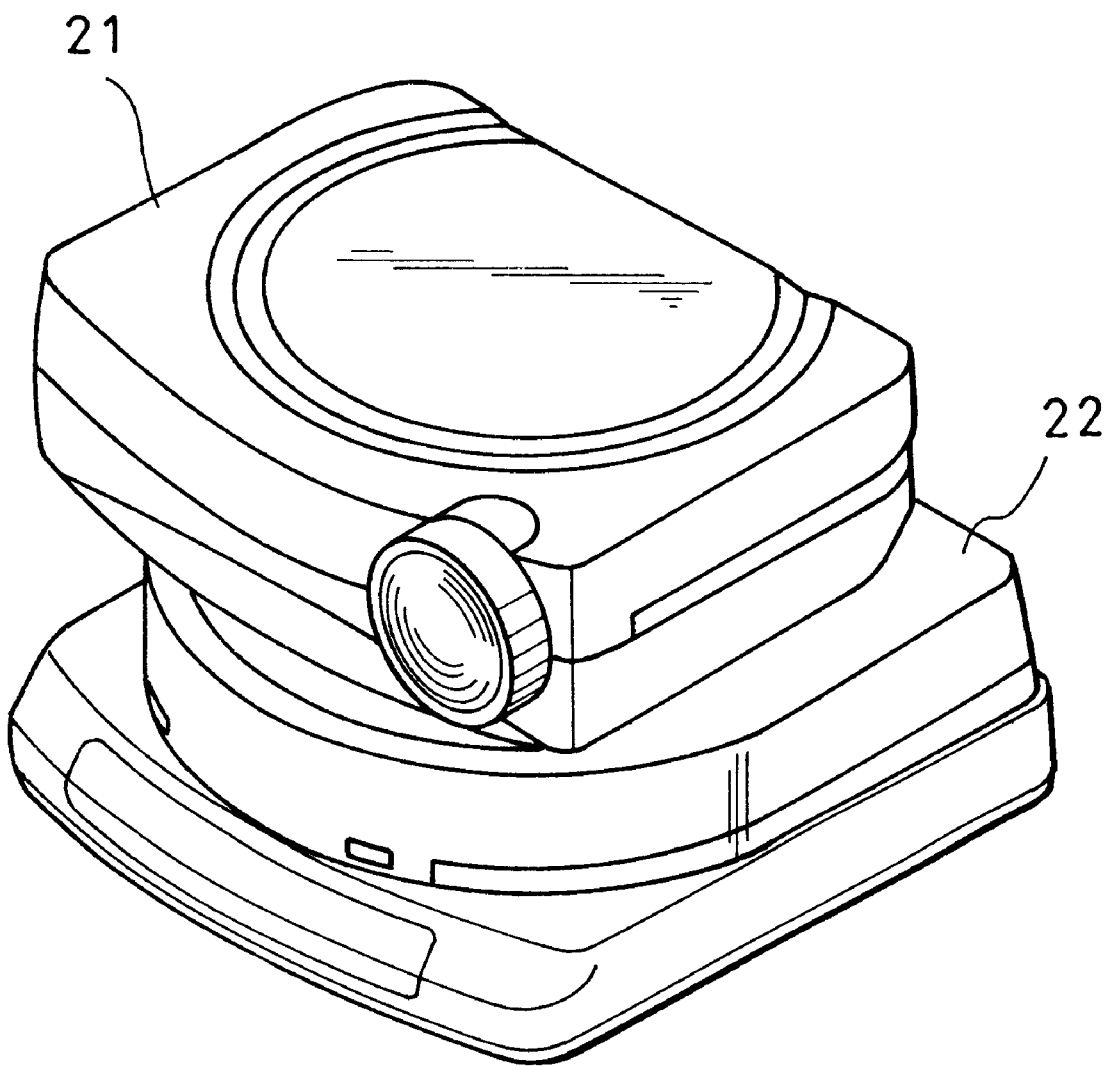
FIG. 2 is a perspective view showing an outward appearance of the image input apparatus shown in FIG. 1.

The image input apparatus shown in FIGS. 1 to 3 is composed of a camera head unit 21 and a pan head unit 22 which comprises an electric pan head for mounting the camera head unit 21 thereon.

As shown in FIG. 1, the camera head unit 21 comprises a zoom lens 1, an iris 2, an image pickup device 3, a signal processing circuit 4, a camera controller 5, an iris driver 6, a focus controller 7, and a zoom controller 8. The camera controller 5 is capable of mutual communication with the devices and the circuits within the camera head unit 21.

The image pickup device 3 is, for example, a CCD (charge-coupled device) for converting an optical image obtained through the zoom lens 1 into electric signals.

The signal processing circuit 4 generates video signals by subjecting the electric signals from the image pickup device 3 to predetermined processing, and outputs the video signals to an external monitor (not shown) and a video recording/reproducing apparatus (also not shown) through a terminal Vout. Parameters related to the processing performed on the electric signals from the image pickup device 3 by the signal processing circuit 4 are controlled by the camera controller 5.

The iris driver 6 drives the iris 2 so that the amount of light passing from the zoom lens 1 to the image pickup device 3 is a predetermined amount, that is, the electric signals from the image pickup device 3 are at a substantially constant level. The drive amount of the iris 2 is designated by the camera controller 5.

The focus controller 7 drives some of the lenses constituting the zoom leans 1 so that the zoom lens 1 is focused on a predetermined subject. The drive amount is designated by the camera controller 5.

The zoom controller 8 drives some of the lenses constituting the zoom lens 1 to obtain a predetermined focal length of the zoom lens 1. The drive amount is designated by the camera controller 5.

The camera controller 5 comprises a memory (not shown) and a CPU (also not shown). The CPU determines the drive amounts of the iris driver 6, the focus controller 7, and the zoom controller 8 based on information from an I/F controller 16, which will be described later, and controls the processing operation of the signal processing circuit 4. The memory stores data on the focal length and weight of the zoom lens 1 and the like.

The camera controller 5 is provided with an input/output terminal 10 for connecting the camera controller 5 to an external device (for example, a personal computer, a work station and a codec in a videoconference system) through the I/F controller 16 to allow communication therebetween. The control terminal 9 for connecting the camera controller 5 to a pan head control switching mechanism 11 of the pan head unit 22 which will be described later. The control terminal 9 is provided with three operating portions 9a, 9b and 9c for setting a pan head operation with respect to the camera head unit 21.

Figure 4:
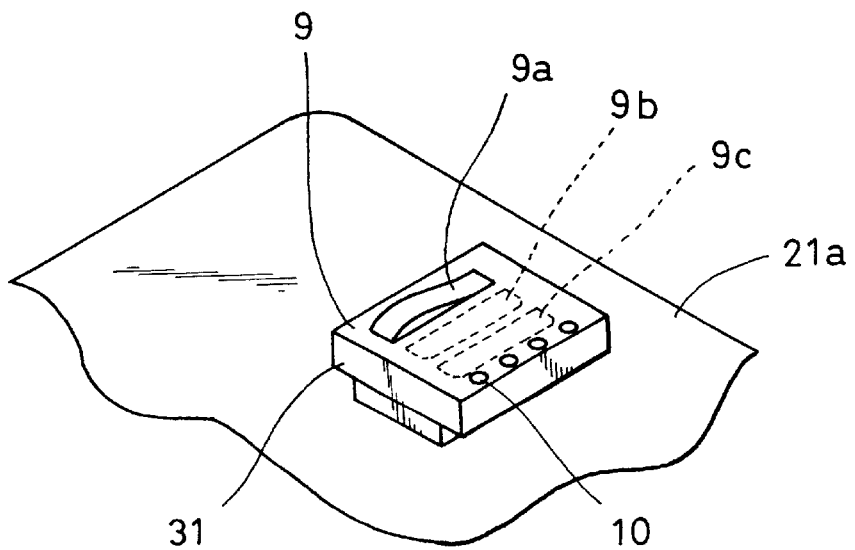
FIG. 4 is a perspective view showing a control terminal and an input/output terminal provided in the camera head unit of the image input apparatus shown in FIG. 1.

The control terminal 9 and the input/output terminal 10 are, as shown in FIG. 4, formed in a support member 31 attached to the rear of a housing 21a of the camera head unit 21. The operating portions 9a, 9b and 9c are spaced in parallel, and the shapes thereof are respectively determined in accordance with head operations set with respect to the camera head unit 21. In this embodiment, the operating portion 9a is shaped like a projection, and the operating portions 9b and 9c are flat. The input/output terminal 10 is located adjacent to the operating portion 9c.

The pan head unit 22 is, as shown in FIG. 3, provided with a pedestal 22a having a holding mechanism 42 for interchangeably holding the camera head unit 21. The pedestal 22a is turned on the horizontal axis (in a pan direction) and on the vertical axis (in a tilt direction) by an optical axis controller 15. This movement of the pedestal 22a changes the direction of the optical axis of the camera head unit 21, that is, the image taking area.

The optical axis controller 15 comprises a horizontal driver 13 for driving the pedestal 22a in the pan direction, a horizontal position detector 13a for detecting the drive amount of the pedestal 22a in the pan direction, a vertical driver 14 for driving the pedestal 22a in the tilt direction, and a vertical position detector 14a for detecting the drive amount of the pedestal 22a in the tilt direction. The structures of the horizontal driver 13 and the vertical driver 14 will be described later.

The horizontal driver 13 and the vertical driver 14 are controlled by a pan head controller 12, and the control amount is determined by using the driving voltage and the driving speed. The pan head controller 12 has a CPU (central processing unit; not shown) and a memory (also not shown). The CPU determines the aforesaid control amount for each of control modes previously stored in the memory. The control mode is selected based on a selection signal from a pan head control switching mechanism 11 as will be described later. In this embodiment, as shown in FIG. 10, eight control modes M1, . . . , M8 are selectable with reference to the weight and the focal length of the lens 1 in the camera head unit 21.

Figure 11:
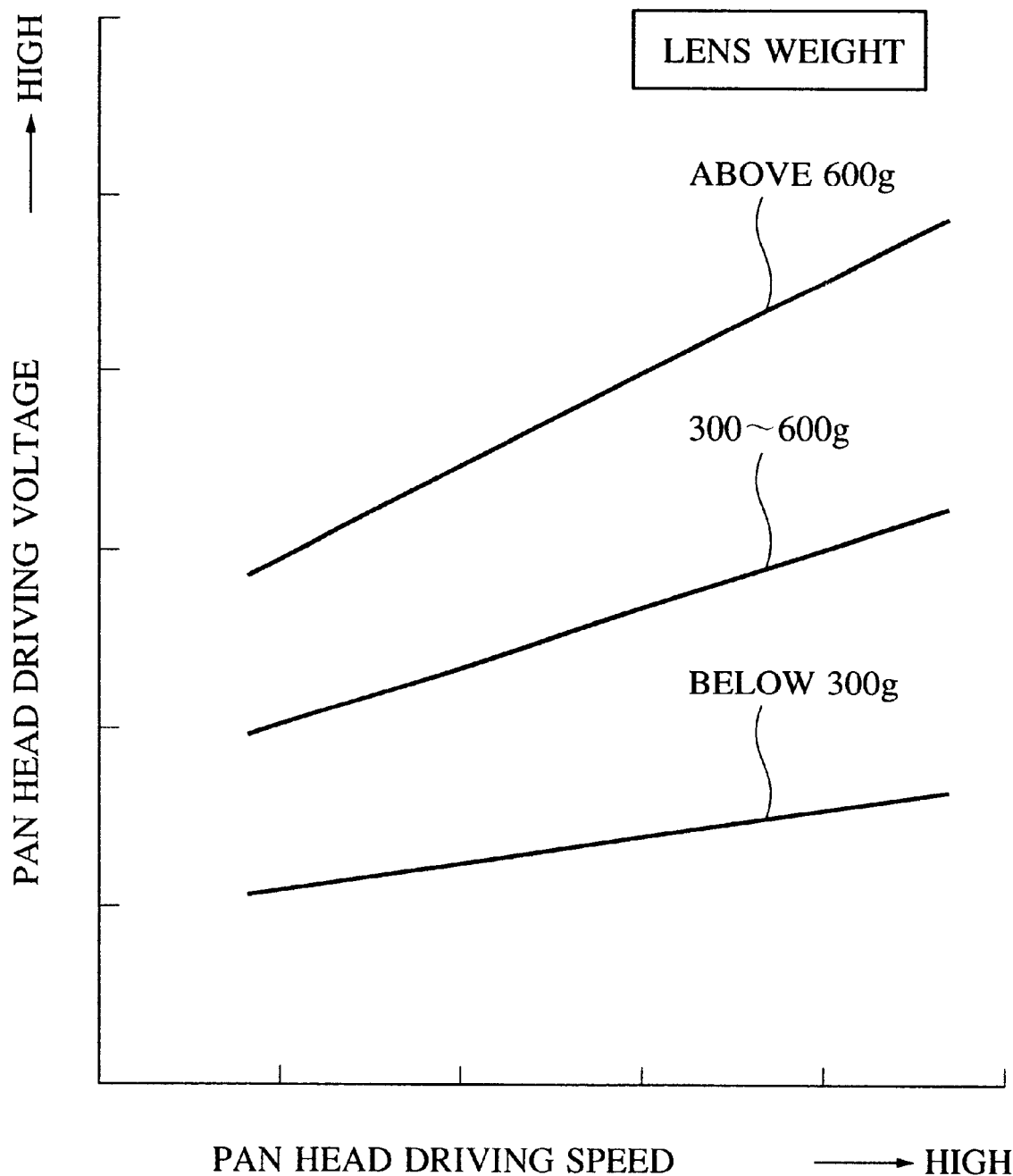
FIG. 11 is a graph showing the relation between the driving speed and the driving voltage of the pan head when the weight of a lens is used as a parameter.
Figure 12:
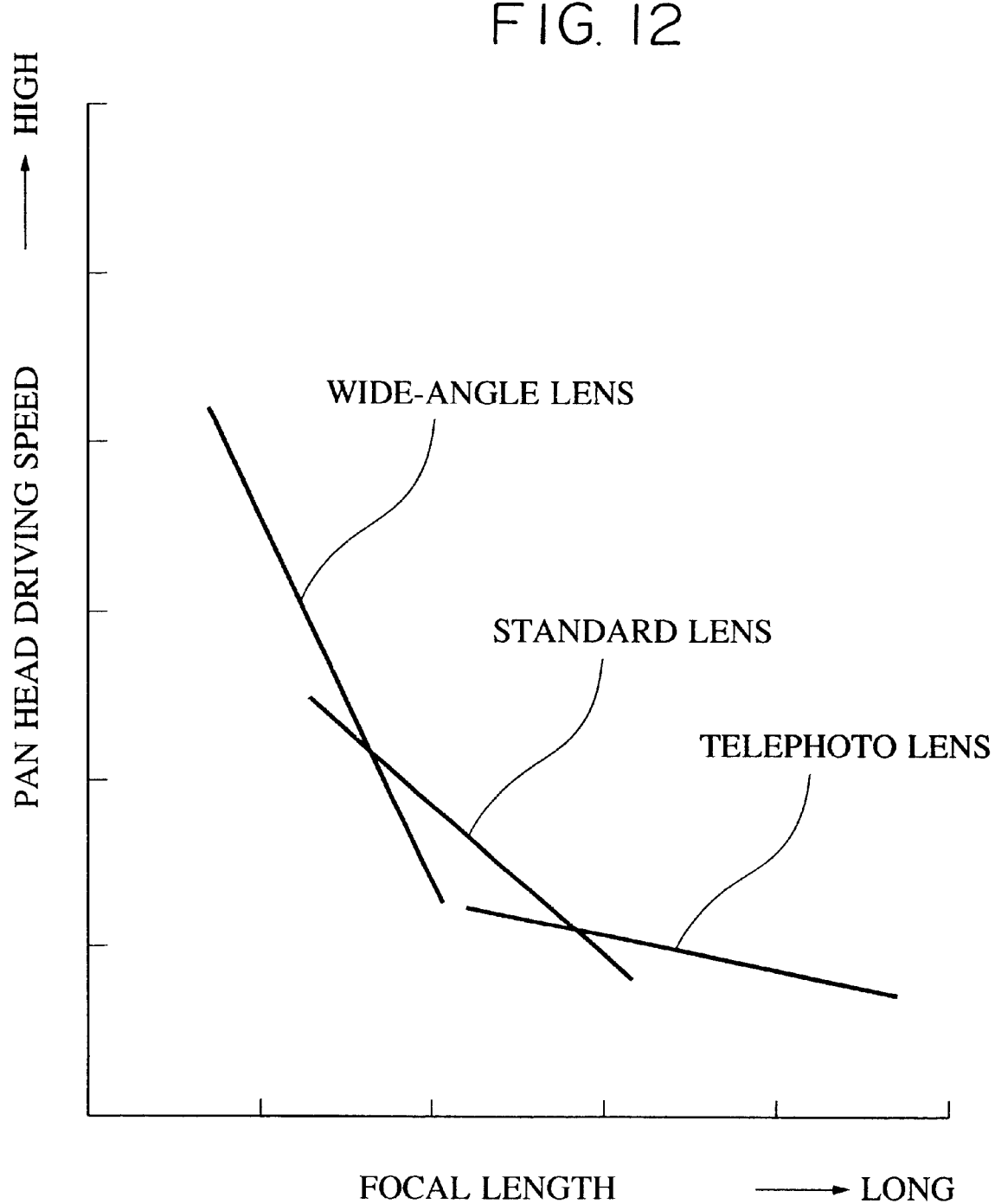
FIG. 12 is a graph showing the relation between the pan head driving speed and the lens focal length when the focal length is used as a parameter.

As the driving voltage in the control modes, one of three patterns set in accordance with the weight of the zoom lens 1 as shown in FIG. 11 is selected. The lens weight is divided into three regions, i.e., above 600 g, 600 g to 300 g and below 300 g, and the patterns of the driving voltage are set corresponding to the respective regions of the lens weight. Similarly, as the driving speed in the control modes, one of three patterns set in accordance with the focal length of the zoom lens 1 is selected as shown in FIG. 12. The focal length of the zoom lens 1 is divided into three regions, a wide-angle lens focal length, a standard lens focal length, and a telephoto lens focal length, and the patterns of the driving speed are set corresponding to the respective regions. The driving speed is set such as to decrease as the focal length increases from the wide-angle lens to the telephoto lens.

The pan head control switching mechanism 11 provided on the holding mechanism of the pedestal 22a has three terminals 11a, 11b and 11c and an input/output terminal 17. The terminal 11a is located to be opposed to the operating portion 9a of the control terminal 9 when the camera head unit 21 is attached to the pedestal 22a. Similarly, the terminals 11b, and 11c are positioned corresponding to the operating portions 9b and 9c of the control terminal 9, respectively. The input/output terminal 17 is located to be opposed to the input/output terminal 10.

Figure 5:
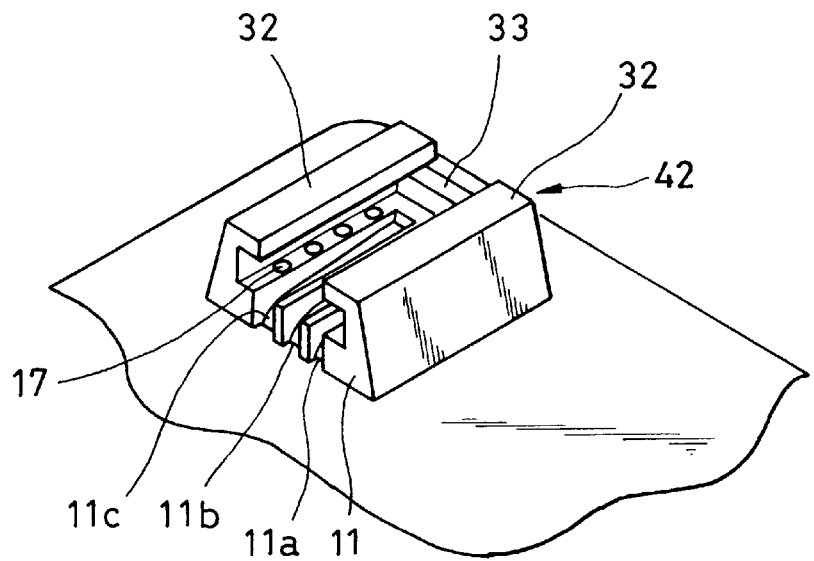
FIG. 5 is a perspective view showing a terminal and an input/output terminal of a pan head control switching mechanism provided in the pan head unit of the image input apparatus shown in FIG. 1.

The pan head control switching mechanism 11 also has a bracket 32 attached to the holding mechanism 42 of the pedestal 22a as shown in FIG. 5. The bracket 32 comprises the terminals 11a, 11b, and 11c, the input/output terminal 17, and a stopper 33 for positioning the support member 31 of the camera head unit 21. The terminals 11a, 11b and 11c are spaced in parallel.

Figure 6:
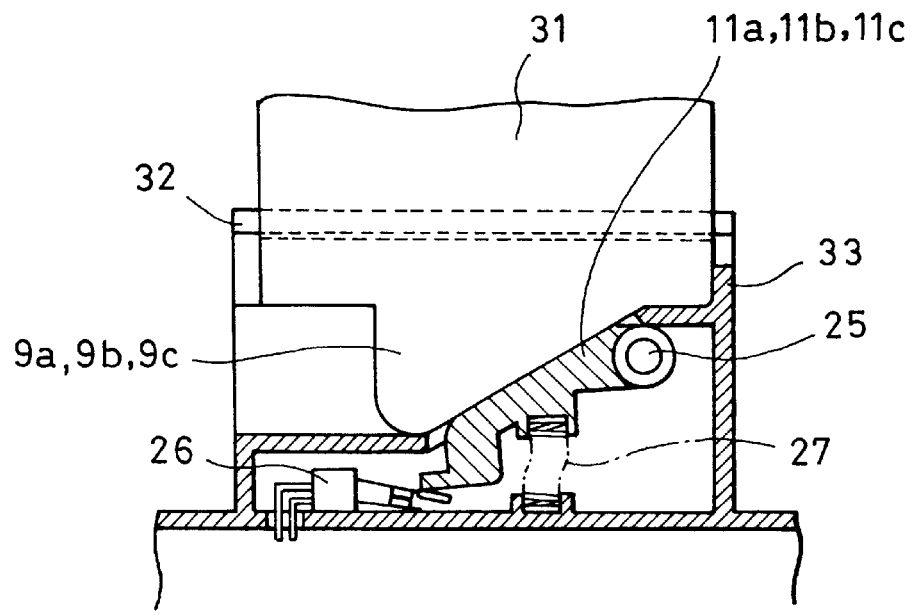
FIG. 6 is a view showing a connecting state of operating portions of the control terminal of the camera head unit and the terminals of the pan head unit control switching mechanism.
Figure 7:
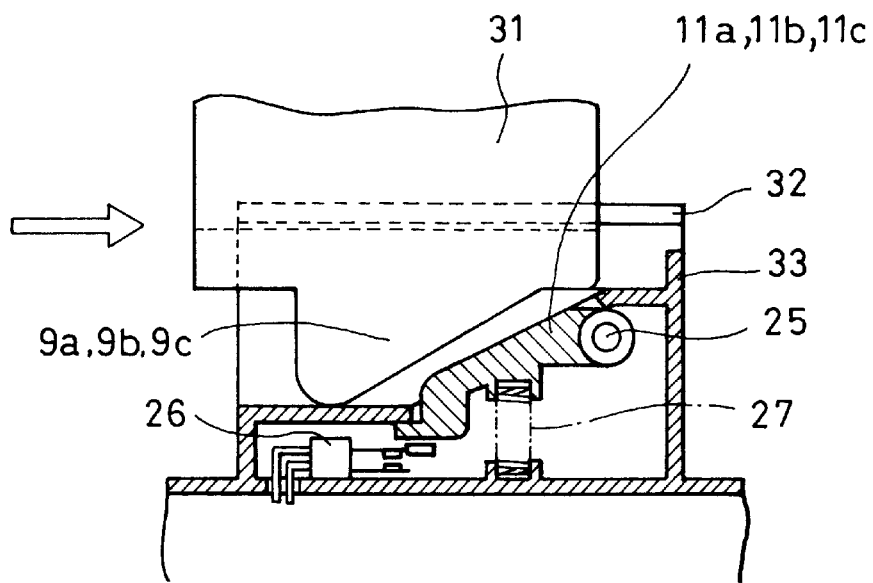
FIG. 7 is a view showing a state before the operating portions of the control terminal of the camera head unit and the terminals of the pan head unit control switching mechanism are connected.

The terminals 11a, 11b and 11c are each, as shown in FIGS. 6 and 7, turnably supported at one end thereof by a shaft 25 attached to the bracket 32, urged by a spring member 27 at the center thereof, and held in such a position that the other end thereof is in contact with a part of the bracket 32 against the spring force of the spring member 27 as shown in FIG. 7. Actuating switches 26 are respectively opposed to the other ends of the terminals 11a, 11b and 11c. When the terminal 11a, 11b or 11c is pressed by the corresponding operating portion 9a, 9b or 9c as shown in FIG. 6, the other end thereof presses the actuating switch 26, thereby performing a turning-on operation. In other words, signals generated in response to the turning-on operations of the actuating switches 26 are given as selection signals to the pan head controller 12, and the control mode is selected by the pan head controller 12 according to the combination of these selection signals. In short, selection signals for determining a proper control mode to the camera head unit 21 are generated by choosing respective shapes of the operating portions 9a, 9b and 9c such as to make the corresponding actuating switches 26 perform turning-on operations. In this embodiment, as mentioned above, eight control modes M1, . . . , M8 are selectable with reference to the weight and focal length of the lens 1 in the camera head unit 1. Since the operating portion 9a projects and the operating portions 9b and 9c are flat, the actuating switch 26 corresponding to the terminal 11a performs a turning-on operation and the actuating switches 26 corresponding to the other terminals 11b and 11c do not perform any turning-on operation, by which the control mode M1 is selected. The control mode M1 is set under the condition that the lens weight is less than 300 g and the focal length is standard.

When the bracket 32 is fitted on the support member 31 of the camera head unit 21, the input/output terminal 17 is electrically connected to the input/output terminal 10, by which the camera controller 5 and the I/F controller 16 are connected through the input/output terminals 10 and 17 so as to communicate with each other.

The I/F controller 16 receives an operation control signal from external equipment (such as a computer), and sends information about the camera head unit 21 and the pan head unit 22 to the external equipment. As is clear from the above description, the pan head controller 12 is capable of communication with other devices in the pan head unit 22.

Figure 8:
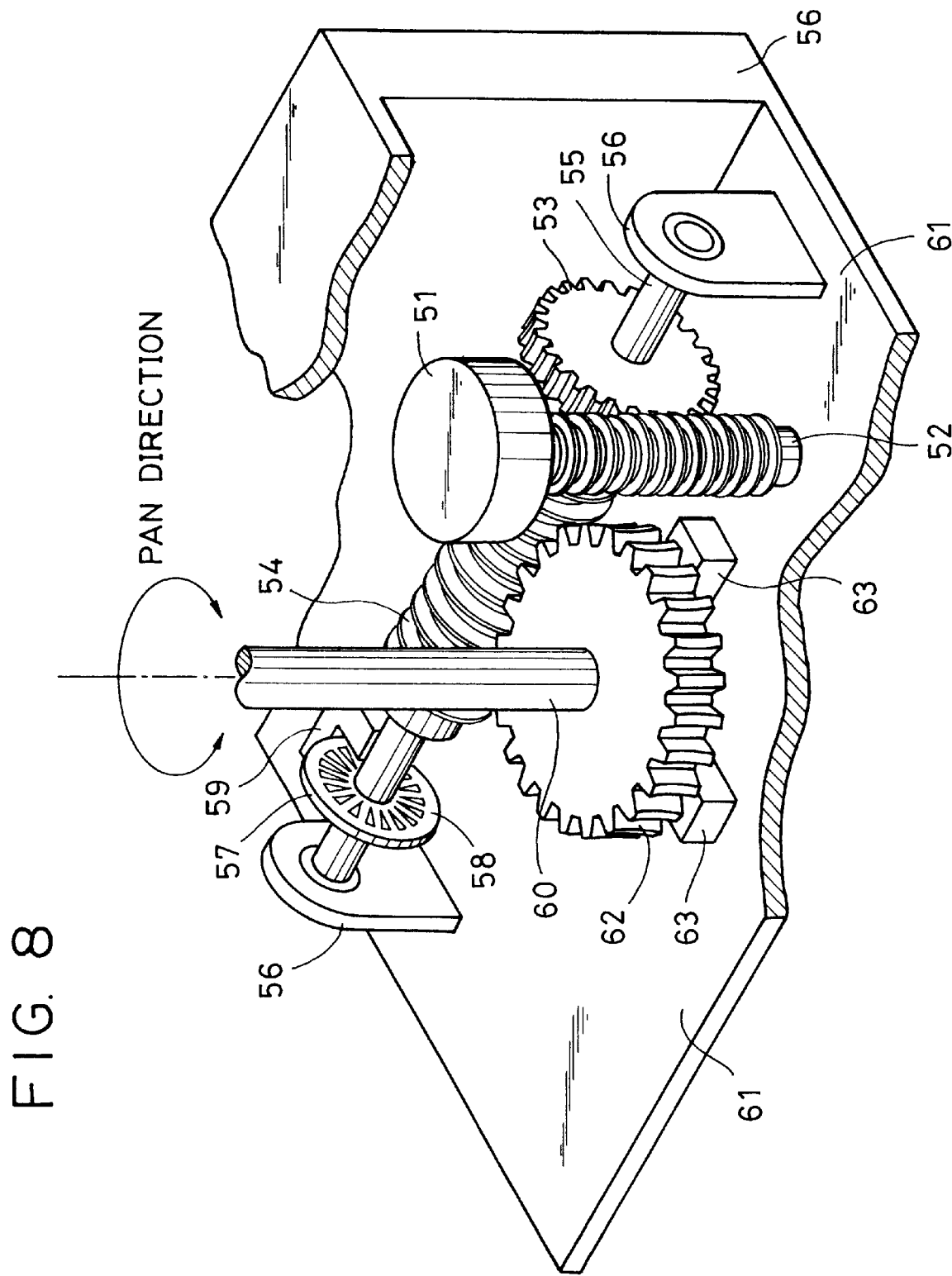
FIG. 8 is a perspective view showing the structure of a horizontal driver in the image input apparatus shown in FIG. 1.

The structure of the horizontal driver 13 will be described in detail with reference to FIG. 8. FIG. 8 is a perspective view showing the structure of the horizontal driver 13 in the image input apparatus shown in FIG. 1.

The horizontal driver 13 has a stepper motor 51 supported by a support member (not shown), as shown in FIG. 8. A worm gear 52 is attached to an output shaft of the stepper motor 51 at one end, and rotatably supported by a base 61 at the other end thereof. A helical gear 53 mounted on a shaft 55 is meshed with the worm gear 52. Both ends of the shaft 55 are rotatably supported by corresponding support plates 56.

A worm gear 54 and a disk 57 with a plurality of slits 58 are fixed on the shaft 55. A helical gear 62 mounted on a shaft 60 is meshed with the worm gear 54. The shaft 60 is supported rotatably in the pan direction by the base 61.

The helical gear 62 is provided with a pin (not shown) which projects toward the base 61 and actuates two microswitches 63 mounted on the base 61 in correlation to the rotation of the helical gear 62. An initial position and an operation limit point (position) in the pan direction of the shaft 60 are sensed by actuating the microswitches 63 with the pin.

The disk 57 is located orthogonal to the optical path formed by a photointerrupter 59 to open and shut the optical path. The photointerrupter 59 detects a signal in response to the opening and closing of the optical path, and the detection signal is given to the horizontal position detector 13a. The horizontal position detector 13a detects the rotation angle of the shaft 60 in the pan direction based on the detection signal from the photointerrupter 59.

Figure 9:
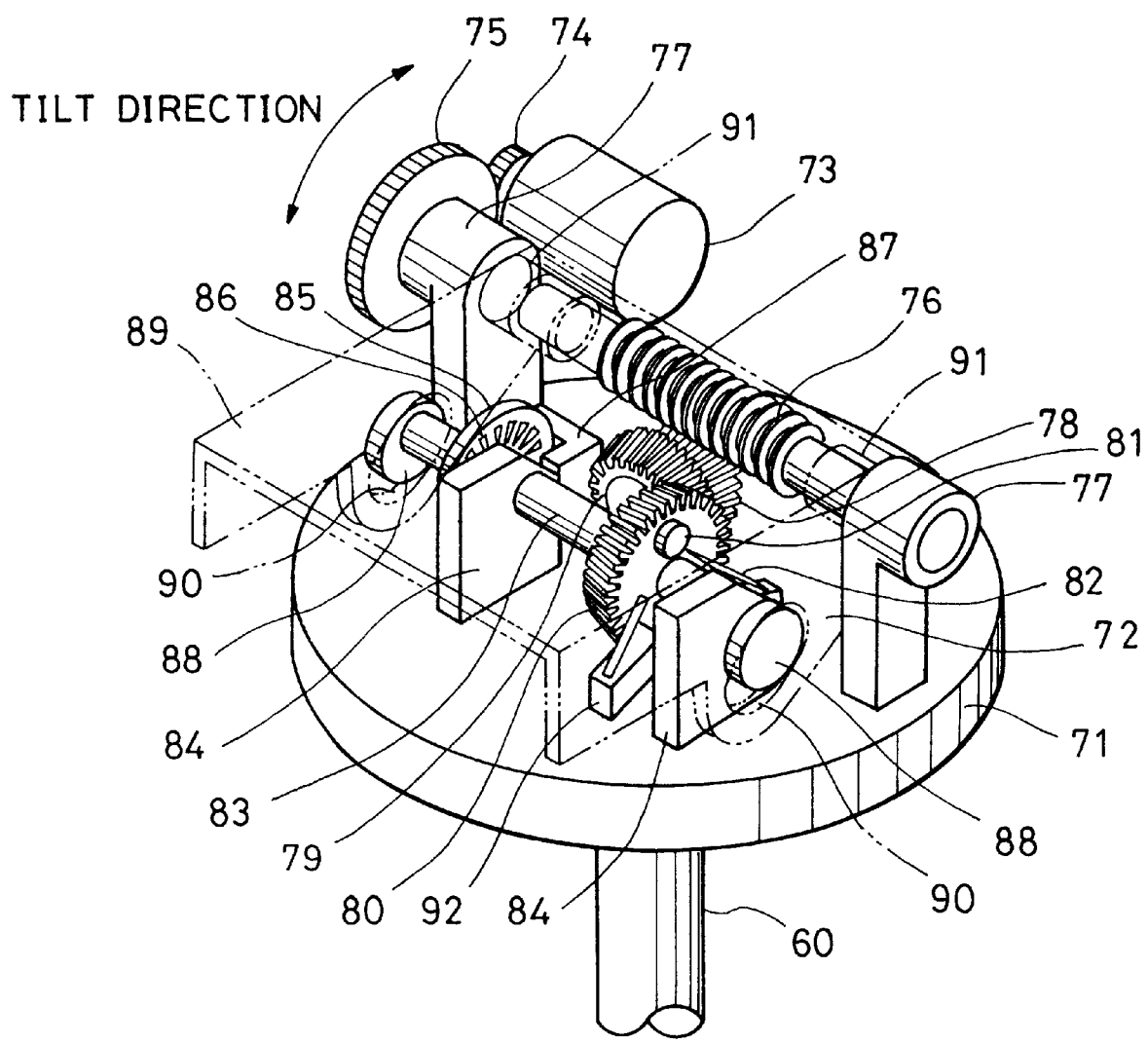
FIG. 9 is a perspective view showing the structure of a vertical driver in the image input apparatus shown in FIG. 1.

The structure of the vertical driver 14 will now be described in detail with reference to FIG. 9. FIG. 9 is a perspective view showing the structure of the vertical driver 14 in the image input apparatus shown in FIG. 1.

The vertical driver 14 is mounted on an operation table 71 attached to the shaft 60 of the horizontal driver 13 as shown in FIG. 9, and provided with a stepper motor 73.

An output shaft of the stepper motor 73 is attached to a spur gear 74 which is meshed with a spur gear 75. The spur gear 75 is integrally fixed to a worm gear 76. Shaft portions 91 at both ends of the worm gear 76 are rotatably supported by bearings 77 attached to the operation table 71, respectively.

The worm gear 76 is meshed with a helical gear 78 integrally fixed to a bevel gear 79. The bevel gear 79 is meshed with a bevel gear 80 mounted on a shaft 83. The shaft 83 is rotatably supported at the center thereof by a bearing 84 fixed on the operation table 71.

Elliptic cams 88 are attached to both ends of the shaft 83, and respectively fitted in cam grooves 90 formed on a camera head fixing plate 89. The camera head fixing plate 89 is supported by the shaft portions 91 of the worm gear 76 so as to pivot on the shaft portions 91 in a tilt direction in correlation to the movement of the cams 88.

The bevel gear 80 has a pin 81 which projects in parallel with the shaft 83 and actuates two microswitches 82 and 92 in correlation to the rotation of the bevel gear 80. The microswitches 82 and 92 are mounted on the operation table 71. An initial position and an operation limit point (position) in the tilt direction of the camera head fixing plate 89 are sensed by actuating the microswitches 82 and 92 with the pin 81.

A disk 85 with a plurality of slits 86 is fixed on the shaft 83.

The disk 85 is located orthogonal to the optical path formed by a photointerrupter 87 to open and shut the optical path. The photointerrupter 87 detects a signal in response to the open and shut of the optical path, and the detection signal is given to the vertical position detector 14a. The vertical position detector 14a detects the rotation angle of the camera head fixing plate 89 in the tilt direction based on the detection signal from the photointerrupter 87.

Figure 13:
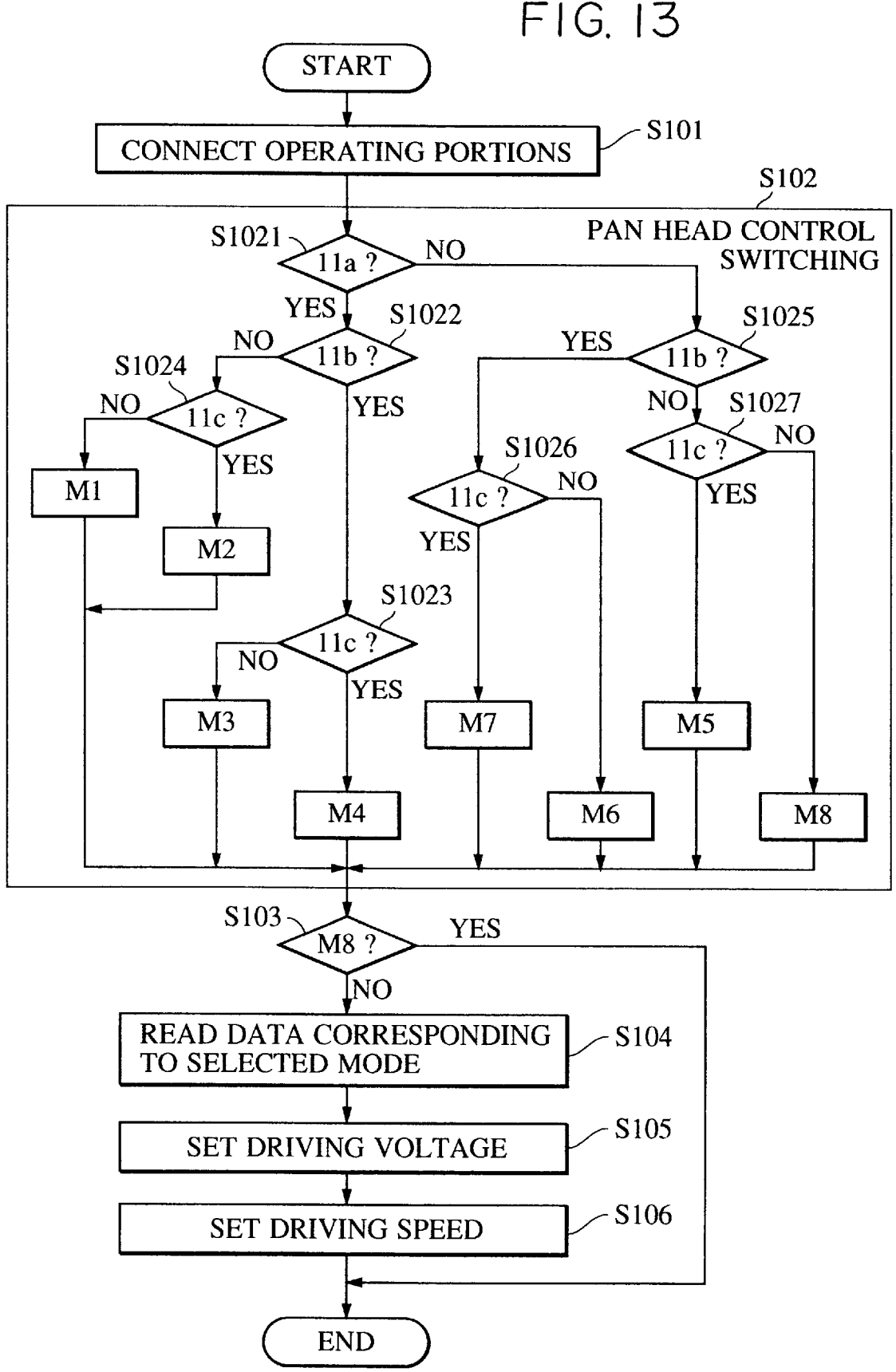
FIG. 13 is a flowchart showing a pan head control switching operation in the image input apparatus shown in FIG. 1.

A pan head control switching operation in the image input apparatus will now be described with reference to FIG. 13. FIG. 13 is a flowchart showing the pan head control switching operation in the image input apparatus shown in FIG. 1.

When the camera head unit 21 is mounted on the pan head unit 22, as shown in FIG. 13, the support member 31 of the camera head unit 21 (shown in FIG. 4) is fitted in the bracket 32 of the pan head unit 22 (shown in FIG. 5) (Step S101).

The terminals 11a, 11b and 11c are pressed by the corresponding operating portions 9a, 9b and 9c in correlation to the fitting of the support member 31 and the bracket 32. Then, the actuating switches 26 are pressed by the other ends of the terminals 11a, 11b and 11c, thereby performing turning-on operations. In other words, signals generated by the turning-on operations of the actuating switches 26 are given as selection signals to the pan head controller 12, and one of the control modes M1, . . . , M8 is selected by the pan head controller 12 according to the combination of these selection signals (step S102). In this embodiment, the terminal 11a is pressed by the operating portion 9a, the actuating switch 26 corresponding to the terminal 11a performs a turning-on operation, and other actuating switches 26 do not perform any turning-on operations, by which the control mode M1 is selected.

Next, it is judged whether or not the selected control mode is Mode M8 (Step S103). If the selected control mode is M8, that is, if the camera head unit 21 is not mounted on the pan head unit 22, the process ends.

If the selected control mode is a mode other than M8, data corresponding to the selected control mode is read from the memory (Step S104), and the driving voltage in accordance with the lens weight is set (Step S105). After setting the driving voltage, the driving speed in accordance with the lens focal length is set (Step S106).

Accordingly, when the camera head unit 21 is mounted on the pan head unit 22, the driving voltage and driving speed best-suited to the weight and focal length of the zoom lens 1 in the camera head unit 1 are automatically selected. Specifically, when a light lens is mounted, that is, when the camera head unit 21 is light, the driving voltage is set at a low value, which achieves small power consumption and reduced noise. When a wide-angle lens is used, since the driving speed of the pan head unit 22 is set high, an arbitrary subject can be captured instantaneously. When a telephoto lens is used, a subject can be captured accurately by driving the pan head unit 22 at low speed. As mentioned above, when the camera head unit 21 is mounted on the pan head unit 22, the optimum pan head operation with reference to the weight and focal length of the zoom lens 1 in the camera head unit 21 can be selected automatically, and the selection of the pan head operation best-suited to the camera head unit 22 can be simplified.

Since the size of the camera head unit 21 capable of being mounted on the pan head unit 22 is predetermined, there is no need to excessively increase the driving force of the pan head unit 22 and the rise in cost of the pan head unit 22 can be restricted.

Furthermore, since the pan head unit 22 interchangeably mounts the camera head unit 21 thereon, it is possible to select the camera head unit 21 having a lens suited to the intended use and to obtain high general versatility.

Figure 14:
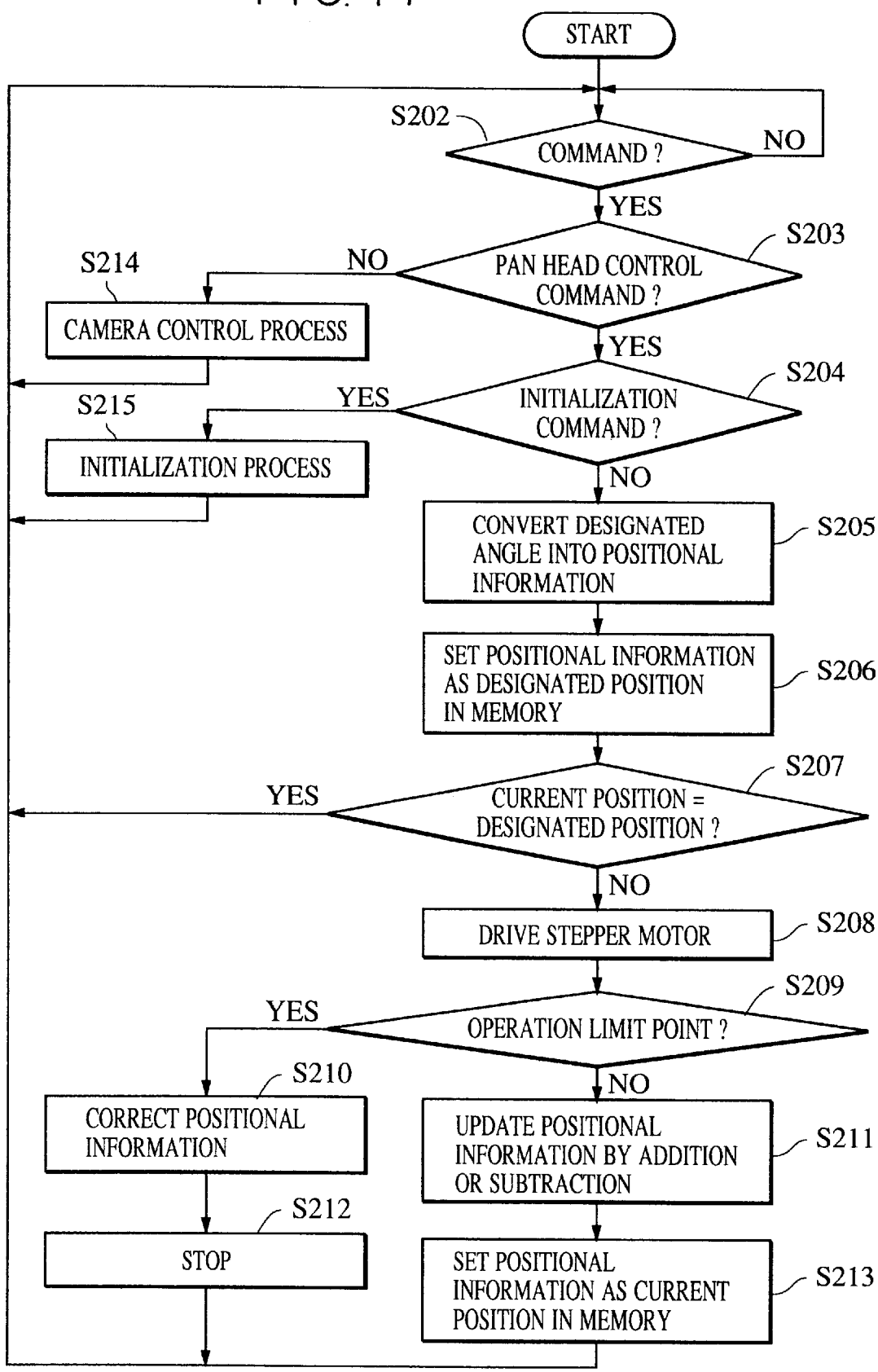
FIG. 14 is a flowchart showing an optical axis control operation in the image input apparatus shown in FIG. 1.

An optical axis control operation will now be described with reference to FIG. 14. FIG. 14 is a flowchart showing an optical axis control operation of the image input apparatus shown in FIG. 1.

After the camera head unit 21 is mounted on the pan head unit 22, an external device for giving operation guidance to the camera head unit 21 and the pan head unit 22 is connected to a terminal I/F of the pan head unit 22 through a cable. After the completion of the connection, the camera head unit 21 and the pan head unit 22 are capable of operation.

Referring to FIG. 14, first, a command from the external device is waited for (Step S202). When a command is input from the external device, it is judged by the I/F controller 16 whether or not the input command is a command relating to the pan head unit 22 (Step S203). If the input command is not a command relating to the pan head unit 22, that is, if the input command is a command relating to the camera head unit 21, the command is sent from the I/F controller 16 to the camera controller 5 through the input/output terminals 17 and 10. Based on the command, the zoom operation of the zoom lens 1, the operation of the iris 2 and the like are controlled (Step S214).

When the input command relates to the pan head unit 22, it is judged whether or not the command is an initialization command (Step S204). If the command is an initialization command, it is sent to the pan head controller 22, which executes an initialization process for setting the optical axis of the zoom lens 1 in an initial position (Step S215). The initialization process will be described in detail later.

If the input command is not an initialization command, that is, if the input command is information for designating the angle of the optical axis in the pan direction or the tilt direction, the angle designated by the command is converted into positional information (Step S205), and the positional information is stored as a designated position in the memory (Step S206).

Subsequently, it is judged whether or not the current position of the optical axis agrees with a designated position (Step S207). If the optical axis is currently in the designated position, the process from Step S201 on is executed again.

If the current position of the optical axis does not agree with the designated position, the stepper motor 51 of the horizontal driver 13 or the stepper motor 73 of the vertical driver 14 is driven to start the angle adjustment in the pan direction or the tilt direction so that the optical axis reaches from the current position to the designated position (Step S208).

After the angle adjustment in the pan direction or the tilt direction is started, it is judged whether or not the horizontal driver 13 or the vertical driver 14 reaches an operation limit point before the optical axis reaches from the current position to the designated position (Step S209). If it is judged that the horizontal driver 13 or the vertical driver 14 reaches the operation limit point before the optical axis reaches from the current position to the designated position, a positional information correction process is carried out to reset the designated position stored in the memory (Step S210), and the stepper motor 51 of the horizontal driver 13 or the stepper motor 73 of the vertical driver 14 is stopped (Step S212). After the stepper motor 51 or 73 is stopped, the process from Step S201 on is executed again.

If it is judged that the horizontal driver 13 or the vertical driver 14 does not reach the operation limit point before the optical axis reaches from the current position to the designated position, the position of the optical axis is sequentially updated by a computation such as addition or substraction, and the stepper motor 51 of the horizontal driver 13 or the stepper motor 73 of the vertical driver 14 is driven until the optical axis reaches from the current position to the designated position (Step S211). When the optical axis reaches the designated position, the current position stored in the memory is updated (Step S213). After updating the current position, the process from Step S201 on is executed again.

When the command input from the external device is a command for the camera head unit 21, it is sent from the I/F controller 16 to the camera controller 5 through the input/output terminals 17 and 10. When the input command is a command for the pan head unit 22, it is sent from the I/F controller 16 to the pan head controller 12. Accordingly, it is possible to combine a control line for the camera head unit 21 and a control line for the pan head unit 22 into one line, and thereby, to eliminate excess trouble of separately laying the control lines for the camera head unit 21 and the pan head unit 22 as in the conventional apparatus in which a camera can be mounted on a pan head. Furthermore, since the I/F controller 16 is set to communicate with the external device, there is no need to add a special connecting device which allows communication between the I/F controller 16 and the external device.

Figure 15:
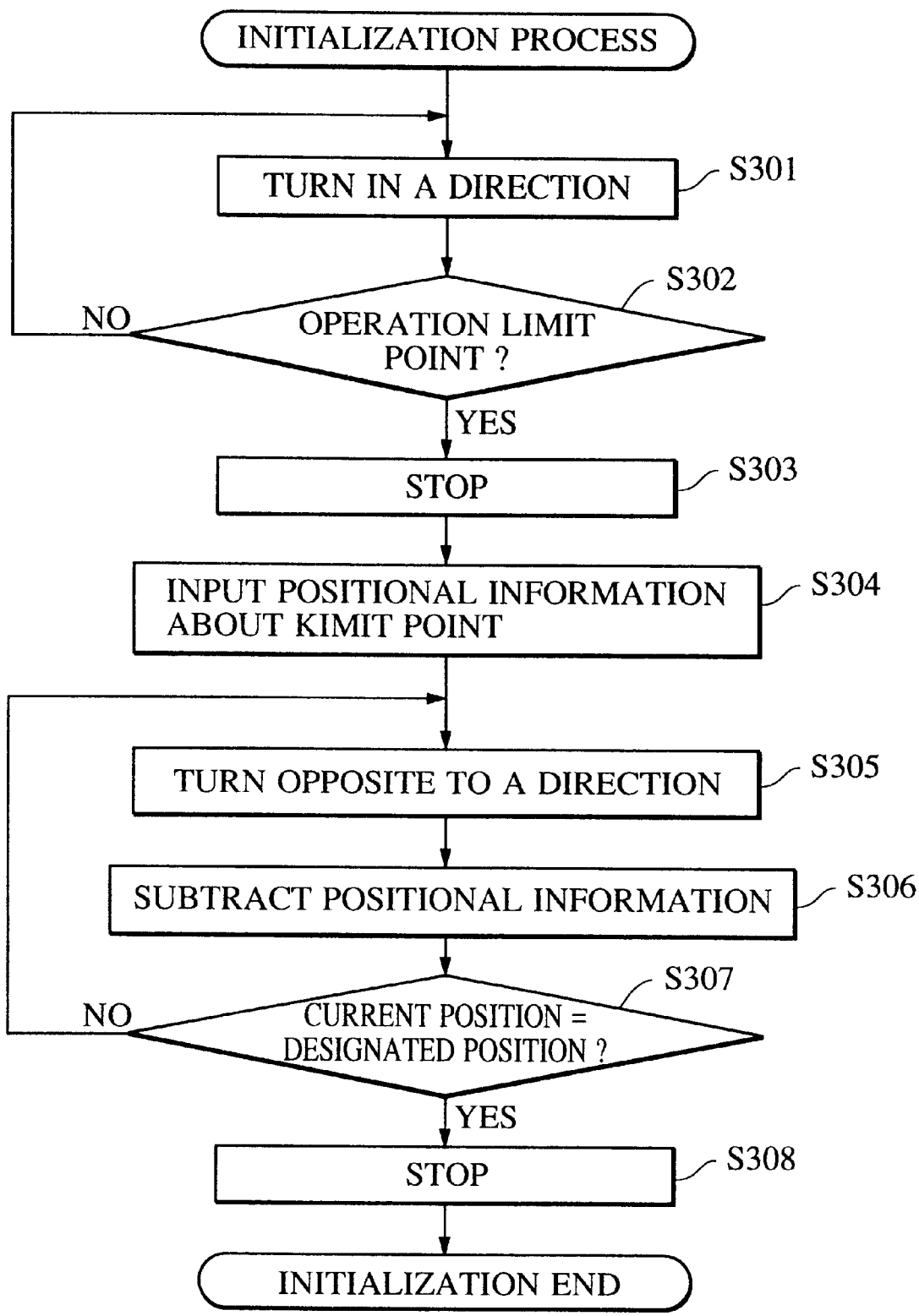
FIG. 15 is a flowchart showing an initialization process of the optical axis control operation in the image input apparatus shown in FIG. 1.

Next, the initialization process for the pan head unit 22 will be described with reference to FIG. 15. FIG. 15 is a flowchart showing an initialization process in the optical axis control operation of the image input apparatus shown in FIG. 1.

In the initialization process, initialization in the horizontal direction is first performed. When the initialization in the horizontal direction is started, as shown in FIG. 15, directions are given to make a turn in an A direction (for example, a horizontal and clockwise direction), and the stepper motor 51 of the horizontal driver 13 is driven (Step S301). The drive of the stepper motor 51 in the horizontal driver 13 is continued until an operation limit point of the shaft 60 is detected in response to the actuation of the microswitch 63. When the operation limit point is detected, the stepper motor 51 is stopped (Steps S302 and S303).

When the stepper motor 51 is stopped, positional information corresponding to the operation limit point is stored in the memory (Step S304).

Next, directions are given to make a turn opposite to the A direction (in a horizontal and counterclockwise direction), the stepper motor 51 of the horizontal driver 13 is driven (Step S305), and the current positional information is calculated by subtracting positional information corresponding to the drive amount of the stepper motor 51 from the positional information stored in the memory (Step S306).

The positional information corresponding to the drive amount of the stepper motor 51 is found from the rotation angle of the shaft 60 in the pan direction obtained based on the above-mentioned detection signal of the photointerrupter 59.

The stepper motor 51 is driven until the calculated current positional information agrees with predetermined information designated and stored in the memory. When the current positional information agrees with the designated information stored in the memory, the stepper motor 51 is stopped (Steps S307, S308). After the stop of the stepper motor 51, the initialization process in the horizontal direction ends.

Subsequently, initialization in the vertical direction is performed by using a similar procedure to the initialization in the horizontal direction. The description of the initialization in the vertical direction is omitted in this embodiment.

Thus, an absolute value of the optical axis of the zoom lens 1 can be detected and the direction of the optical axis can be set arbitrarily by executing the initialization process.

Although the camera head unit 21 is moved by the operation of the optical axis controller 15 in this embodiment, the camera head unit 21 and the signal processing circuit 4 may be separated from each other, a package for housing the zoom lens 1, the image pickup device 3 and the like together may be driven by the optical axis controller 15.

If there is no need to greatly change the image taking area (position), a driving method for changing the relative position between the zoom lens 1 and the image pickup device 3, a method of changing the optical axis of incident light by placing a variable vertical angle prism in front of the zoom lens 1, or a method of changing the angle relative to the optical axis by placing a plate glass member (whose opposite surfaces are parallel) in the optical path may be adopted. Furthermore, mode information stored in the memory may be read into the pan head unit when the camera head unit is mounted on the pan head unit. Still further, more accurate motion control can be exerted by storing information about the lens weight, focal length and the like in the memory, not as mode information, but as concrete numeric values.

The pan head in the above-mentioned embodiment is equipped with a holding mechanism attached to a pedestal to interchangeably hold an image pickup device, and a pan head control switching mechanism for performing switching so as to select and control a pan head operation suited to the image pickup device when the image pickup device is mounted on the holding mechanism. The pan head operation corresponding to the image pickup device is selected and carried out by a drive means based on the switching operation of the pan head control switching mechanism. Therefore, it is possible to achieve an image input apparatus which is excellent in general versatility and low in cost and is capable of changing pan head control with no trouble.

In addition, since the pan head has an input/output terminal to be connected to an input/output terminal of the image pickup device for signals relating to control when the image pickup device is mounted on the holding mechanism, the trouble of laying another control line separate from a control line for the image pickup device can be eliminated.

The individual components shown in outline or designated by blocks in the Drawings are all well-known in the image recording arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A pan head for mounting an image pickup device thereon and for changing the image pickup direction of the image pickup device, said pan head comprising:
   (a) a holding member for selectively holding one of a plurality of different image pickup devices each of which has a control mode which is different from the other image pickup devices;
   (b) a receiving device that receives from the attached image pickup device an identifying signal that identifies the type of image pickup device being held by said holding member, the identifying signal specifying a pan head operation.

2. A pan head according to claim 1, further comprising a selection device that selects a pan head operation corresponding to the image pickup device mounted on said holding member.

3. A pan head according to claim 2, wherein said selection device generates information used to select the pan head operation based on the identifying signal received by said receiving device.

4. A pan head according to claim 3, further comprising a drive device that executes the pan head operation based on the selection of said selection device.

5. A pan head according to claim 4, further comprising a memory that stores data on operations of said pan head corresponding to different image pickup devices.

6. A pan head according to claim 5, wherein said drive device reads out data on the pan head operation from said memory based on the selection of said selection device when the image pickup device is mounted on said holding member.

7. A pan head according to claim 6, wherein the data on the operation of said pan head comprises data representing at least either the driving voltage or the driving speed of said drive device.

8. A pan head according to claim 1, wherein the image pickup device has a plurality of control terminals for providing the identifying signal, and wherein said receiving device has a plurality of identifying terminals corresponding to the plurality of control terminals of the image pickup device.

9. A pan head according to claim 1, further comprising a plurality of terminals that contacts a corresponding plurality of terminals on the image pickup device, and a plurality of switches respectively coupled to the plurality of pan head terminals, said switches outputting the identifying signal, which identifies operational characteristics of the image pickup device.

10. A pan head according to claim 9, wherein said pan head terminals are disposed in said holding member.

11. A pan head according to claim 9, wherein said detecting device judges a connection state between the terminals when the image pickup device is mounted on said holding member.

12. A pan head according to claim 1, wherein the image pickup device has a lens mounted thereon, and wherein the identifying signal comprises information representing at least either a weight or a focal length of the lens mounted on the image pickup device.

13. A pan head according to claim 1, wherein the image pickup device has an input/output terminal for providing a control signal relating to control of the image pickup device, and further comprising a pan head input/output terminal to be connected to the input/output terminal of the image pickup device for receiving the signal relating to control of the image pickup device when the image pickup device is mounted on said holding member.

14. An image pickup device mountable on a pan head which is capable of changing an image pickup direction of said image pickup device, the pan head having a holding member which detachably holds one of a plurality of image pickup devices each of which has a control mode different from each other, said image pickup device comprising:
   (a) an engaging member engageable with the holding member of the pan head; and
   (b) a transmission device that transmits from the image pickup device to the pan head an identifying signal that identifies the type of image pickup device engaged with the holding member, the identifying signal specifying an operation of the pan head with said image pickup device.

15. An image pickup device according to claim 14, wherein said transmission device has a control terminal for specifying an operation of the pan head.

16. An image pickup device according to claim 14, wherein the pan head has an input/output terminal, and further comprising an image pickup device input/output terminal to be connected to the input/output terminal of the pan head, for transmitting to the pan head input/output terminal a signal relating to the control of said image pickup device when said image pickup device is mounted on the holding member.

17. An image input apparatus having a pan head for mounting an image pickup device thereon and for changing the image pickup direction of said image pickup device, said image input apparatus comprising:
   (a) said image pickup device comprising:
      an engaging member; and
      a transmission device that transmits from the image pickup device to said pan head specification information which specifies the control mode of an operation of said pan head with said image pickup device before an image pickup operation of the attached image pickup device is started, said specification information comprising an identification signal identifying said image pickup device,
   (b) said pan head comprising:
      a holding member being engageable with said engaging member to interchangeably connect said pan head with one of a plurality of image pickup devices each of which has a control mode different from each other;
      a receiving device that receives from said transmission device the specification information of the control mode of the image pickup device; and
      a selection device that selects an operation of said pan head corresponding to the connected image pickup device based on the received specification information.

18. An image input apparatus according to claim 17, wherein said selection device provides selection information for selecting the operation of said pan head based on the specification information received by said receiving device.

19. An image input apparatus according to claim 18, further comprising a pan head drive device that executes the operation of said pan head based on the selection information of said selection device.

20. An image input apparatus according to claim 19, further comprising a pan head memory that stores data on operations of said pan head corresponding to different image pickup devices.

21. An image input apparatus according to claim 20, wherein said drive device (i) reads out from said memory data on the operation of said pan head based on the selection information when said image pickup device is mounted on said holding member, and (ii) executes the operation of said pan head based on the read data.

22. An image input apparatus according to claim 21, wherein the data on the operation of said pan head comprises data representing at least either the driving voltage or the driving speed of said drive device.

23. An image input apparatus according to claim 17, wherein said image pickup device includes a lens mounted thereon, and wherein the specification information for specifying the operation of said pan head comprises information representing at least either a weight or a focal length of the lens.

24. An image input apparatus according to claim 17, wherein said transmission device has a plurality of control terminals that transmits the specification information, and wherein said receiving device has a plurality of identifying terminals corresponding to said plurality of control terminals.

25. An image input apparatus according to claim 24, wherein said selection device (i) determines a connection state between said control terminals and said identifying terminals when said image pickup device is mounted on said holding member, and (ii) generates the selection information based on the determination result.

26. An image input apparatus according to claim 17, further comprising a connecting device that transmits from said pan head to said image pickup device a signal that controls said image pickup device when said image pickup device is mounted on said holding member.

27. A pan head according to claim 1, wherein the identifying signal corresponds to a weight of said image pickup device.

28. A pan head according to claim 27, further comprising a pan head controller that controls pan head movement in accordance with the weight of the image pickup device.

29. A pan head according to claim 1, wherein the identifying signal identifies at least one of (i) a weight and (ii) a focal length of said image pickup device, said pan head further comprising:
   a pan head memory that stores pan head driving data regarding at least one of (i) image pickup device weight and (ii) image pickup device focal length; and
   a pan head controller that controls a driving operation of said pan head based on the stored pan head driving data and the identifying signal received from the image pickup device.

30. A pan head according to claim 29, wherein said identifying signal corresponds to the weight of the image pickup device, and wherein the stored pan head driving data corresponds to pan head driving voltage.

31. A pan head according to claim 29, wherein said identifying signal corresponds to the focal length of the image pickup device, and wherein the stored pan head driving data corresponds to pan head driving speed.

32. An image pickup device according to claim 14, wherein said transmission device comprises a plurality of differently-shaped terminals whose shapes correspond to operational characteristics of said image pickup device.

33. An image pickup device according to claim 32, wherein said plurality of terminals are disposed in said engaging member.

34. An image pickup device mountable on a pan head which is capable of changing an image pickup direction of said image pickup device, the pan head having a holding member, said image pickup device comprising:
   (a) an engaging member engageable with the holding means of the pan head; and
   (b) a transmission device that transmits from the image pickup device directly to the pan head information about an operation of the pan head with said image pickup device, said information comprising a non-video signal, wherein said transmission device comprises a plurality of differently-shaped terminals whose shapes correspond to operational characteristics of said image pickup device,
      wherein the plurality of terminals have a pattern of different shapes based on the weight of the image pickup device.

35. An image pickup device according to claim 32, wherein the plurality of terminals have a pattern of different shapes based on a focal length of the image pickup device.

36. An image pickup device according to claim 14, further comprising a camera controller for controlling camera operations based on a signal output from a controller of the pan head.

37. An image input apparatus according to claim 17, wherein said transmission device comprises a plurality of differently-shaped terminals, the shape of the terminals corresponding to an operational characteristic of said image pickup device, and wherein said selection device detects the different shapes of the image pickup device terminals and varies the operation of the pan head based on the shape of the image pickup device terminals.

38. An image input apparatus having a pan head for mounting an image pickup device thereon and for changing the image pickup direction of the image pickup device, said image input apparatus comprising:
   (a) said image pickup device comprising:
      an engaging member; and
      a transmission device that transmits from the image pickup device directly to said pan head specification information which specifies an operation of said pan head with said image pickup device, said specification information comprising an identification signal identifying said image pickup device,
   (b) said pan head comprising:
      a holding member engageable with said engaging member to interchangeably connect said image pickup device and said pan head;
      a receiving device that receives directly from said transmission device the specification information when said image pickup device is connected to said holding member; and
      a selection device that selects an operation of said pan head corresponding to the connected image pickup device based on the received specification information, said selection device automatically varying an operation of said pan head based on the identification signal,
      wherein said image pickup device transmission device comprises a plurality of differently-shaped terminals, the shape of the terminals corresponding to an operational characteristic of said image pickup device, and wherein said pan head selection device detects the different shapes of the image pickup device terminals and varies the operation of the pan head based on the shape of the image pickup device terminals,
      wherein the shape of the image pickup device terminals corresponds to a weight of the image pickup device and wherein said pan head selection device automatically varies an operation of the pan head based on the weight of the image pickup device.

39. An image input apparatus according to claim 38, wherein said selection device varies a pan head driving voltage based on the weight of the image pickup device.

40. An image input apparatus according to claim 37, wherein the shape of the image pickup device terminals corresponds to a focal length of the image pickup device, and wherein said pan head selection device automatically varies an operation of the pan head in accordance with the focal length of the image pickup device.

41. An image input apparatus according to claim 40, wherein the pan head selection device varies a driving speed of the pan head based on the focal length of the image pickup device.

42. An image input apparatus according to claim 17, wherein said engaging member includes a plurality of terminals which connect with a corresponding plurality of terminals in said pan head holding member, the specification information being transmitted from the image pickup device terminals to the pan head terminals.

43. An image pickup device mountable on a pan head which controls said image pickup device, said image pickup device comprising:
  a transmission device that transmits information from the image pickup device to said pan head, said information comprising information regarding the weight of the image pickup device.

44. A pan head according to claim 1, wherein the identifying signal comprises a non-video signal which comprises information regarding a range for changing the focal length.

45. An image pickup device according to claim 14, wherein the identifying signal comprises a non-video signal which distinguishes the attached image pickup device from other image pickup devices and comprises information regarding a range for changing the focal length.

46. An image pickup device according to claim 43, wherein said information comprises the weight of a lens of said image pickup device.

47. An image pickup device according to claim 43, wherein said pan head changes a driving voltage for changing a direction of the image pickup device based on said information.

48. An image pickup device according to claim 43, wherein said pan head changes a driving speed for changing a direction of the image pickup device based on said information.

49. A pan head for mounting an image pickup device thereon and for controlling said image pickup device, said pan head comprising:
  a holding device the interchangeably holds the image pickup device; and
  a receiving device that receives information comprising information regarding the weight of said image pickup device.

50. A pan head according to claim 49, wherein said information comprises the weight of a lens of said image pickup device.

51. A pan head according to claim 49, further comprising:
  a driving device that drives the pan head based on said information.

52. A pan head according to claim 51, wherein said driving device changes a driving voltage for changing a direction of the image pickup device based on said information.

53. A pan head according to claim 51, wherein said driving device changes a driving speed for changing a direction of the image pickup device based on said information.

54. A control method for controlling a pan head on which an image pickup device is mounted, the method comprising the steps of:
  receiving information from the image pickup device, said information comprising information regarding a weight of the image pickup device; and
  controlling said pan head based on said information.

55. A method according to claim 54, wherein said information comprises the weight of a lens of said image pickup device.

56. A method according to claim 54, further comprising:
  controlling a driving voltage of said pan head for changing a direction of the image pickup device based on said information.

57. A method according to claim 54, further comprising:
  controlling a driving speed of said pan head for changing a direction of the image pickup device based on said information.

58. A control method for controlling a pan head on which an image pickup device is mounted, the method comprising the steps of:
  selectively holding one of a plurality of different types of image pickup devices each of which has a control mode which is different from other types of image pickup devices;
  receiving from the attached image pickup device an identifying signal that identifies the type of image pickup device being held, the identifying signal specifying a pan head operation; and
  controlling said pan head based on the identifying signal.

59. A method according to claim 58, wherein the identifying signal comprises a weight of said image pickup device.

60. A method according to claim 58, wherein the identifying signal comprises a weight of a lens of said image pickup device.

61. A method according to claim 58, further comprising:
  controlling a driving voltage of said pan head for changing a direction of the image pickup device based on the identifying signal.

62. A method according to claim 58, further comprising:
  controlling a driving speed of said pan head for changing a direction of the image pickup device based on the identifying signal.

* * * * *

UNITED STATES PATENT AND TRADEMARK OFFICE
CERTIFICATE OF CORRECTION

PATENT NO.    : 6,445,410 B2
DATED         : September 3, 2002
INVENTOR(S)   : Kenji Kawano It is certified that error appears in the above-identified patent and that said Letters Patent is hereby corrected as shown below:

Column 5,
Line 46, "lib" should read -- 11b --.

Column 7,
Line 18, "open and shut" should read -- opening and shutting --.

Column 11,
Line 15, "devices;" should read -- devices; and --.

Column 15,
Line 52, "the" (1st occurrence) should read -- that --.

Signed and Sealed this

Eighteenth Day of February, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,445,410 B2
DATED         : September 3, 2002
INVENTOR(S)   : Kenji Kawano It is certified that error appears in the above-identified patent and that said Letters Patent is hereby corrected as shown below:

Column 5,
Line 46, "lib" should read -- 11b --.

Column 7,
Line 18, "open and shut" should read -- opening and shutting --.

Column 11,
Line 15, "devices;" should read -- devices; and --.

Column 15,
Line 52, "the" (1st occurrence) should read -- that --.

Signed and Sealed this

Twenty-eighth Day of June, 2005

JON W. DUDAS
*Director of the United States Patent and Trademark Office*